United States Patent [19]

Reid

[11] Patent Number: 5,685,597

[45] Date of Patent: Nov. 11, 1997

[54] VEHICLE WIND DEFLECTOR

[76] Inventor: James Charles Reid, 255 McKerrell Way SE., Calgary, Alberta, Canada, T2Z 1P7

[21] Appl. No.: 563,015

[22] Filed: Nov. 27, 1995

[51] Int. Cl.$^6$ ........................................... B62D 35/00
[52] U.S. Cl. ........................ 296/180.1; 248/290.1; 248/202.1; 248/240; 296/91
[58] Field of Search ................... 296/180.1, 180.2, 296/180.3, 180.4, 180.5, 91, 159, 26; 180/903; 248/290.1, 240, 201, 202.1

[56] References Cited

U.S. PATENT DOCUMENTS

| 790,793 | 5/1905 | Koch | 248/240 |
|---|---|---|---|
| 4,221,425 | 9/1980 | Welle et al. | 296/159 X |
| 4,311,334 | 1/1982 | Jenkins | 296/91 X |
| 4,357,045 | 11/1982 | Kinford, Jr. | 296/180.2 |
| 4,601,508 | 7/1986 | Kerian | 296/180.4 |
| 4,904,015 | 2/1990 | Haines | 296/180.3 |

FOREIGN PATENT DOCUMENTS 1532413  12/1989  U.S.S.R. ........................ 296/180.1

*Primary Examiner*—David M. Mitchell
*Assistant Examiner*—Kia M. Robinson
*Attorney, Agent, or Firm*—David S. Thompson

[57] ABSTRACT

Today when most passenger cars are fabricated without frames, many people are using vans and sports utility vehicles to pull trailers. These vehicles have improved efficiency and apparent power when equipped with a wind deflector. A wind deflector for such vehicles is disclosed which comprises a top member which is mounted on the rear portion of the vehicle and two side members having front side portions which extend downwardly from the top member along the sides of the vehicle. All said members curve outwardly from the front side portions thereof away from the vehicle. All members are molded from semi rigid plastic and have spaced braces on the rear interior side portion thereof. The top and side members are matably fitted together and releasably held together by buckles. The wind deflector is removably mounted on the vehicle using hook bolts, straps and bars which are fastened to the frame beneath the vehicle.

3 Claims, 2 Drawing Sheets

VEHICLE WIND DEFLECTOR

FIELD OF THE INVENTION

This invention relates to vehicle wind deflectors used to aid in pulling a trailer. More particularly, this invention relates to such wind deflectors used on vans, both full size and mini, and sports utility vehicles such as a Ford Bronco™.

BACKGROUND OF THE INVENTION

Wind deflectors are commonly employed by tractor trailers. Use of a wind deflector is known to improve fuel efficiency. Economics virtually mandates the use of wind deflectors. In addition to saving fuel the use of a wind deflector substantially improves vehicle performance and apparent pulling power.

Today most passenger cars are made on unibodies; they have no frame; they have front wheel drive; and they are unsuitable for pulling a trailer. If one wants to pull a trailer they must use either a truck, a van, or a sports utility vehicle such as a Ford Bronco™. For individuals accustomed to driving a car, a van or a sport utility vehicle is the logical choice. The problem is, that wind deflectors made for such vehicles are unavailable.

OBJECTS AND STATEMENT OF THE INVENTION

It is an object of this invention to disclose a wind deflector suitable for use on a van, or a sports utility vehicle. It is an object of this invention to disclose a wind deflector which may be readily positioned and secured on the vehicle for use, and which may also be readily removed from the vehicle after use. It is a further object of this invention to disclose a wind deflector which is lightweight and which may be easily dissembled for convenient shipping and storage. It is a final object of this invention to disclose a wind deflector which may be mounted and removed from a vehicle without scratching or in any other way marking the vehicle.

One aspect of this invention provides for a wind deflector for a vehicle comprising; a top member having a front side portion seated on and extending across the rear portion of the vehicle, said top member curving upwardly from its front side portion to its rear side portion; two side members each having a top side portion releasably fastened to opposite end side portions of the top member, a front side portion extending downwardly along the side portion of the vehicle, said side members curving outwardly from their front side portion to a rear side portion thereof; and, releasable fastening means for fastening the top and side members to the vehicle.

A preferred aspect of this invention provides for a wind deflector as above which is molded from a durable semi rigid plastic and which further comprises braces on each member to strengthen it against wind pressure.

Various other objects, advantages and features of this invention will become apparent to those skilled in the art from the following description in conjunction with the accompanying drawings.

FIGURES OF THE INVENTION

Figure 1:
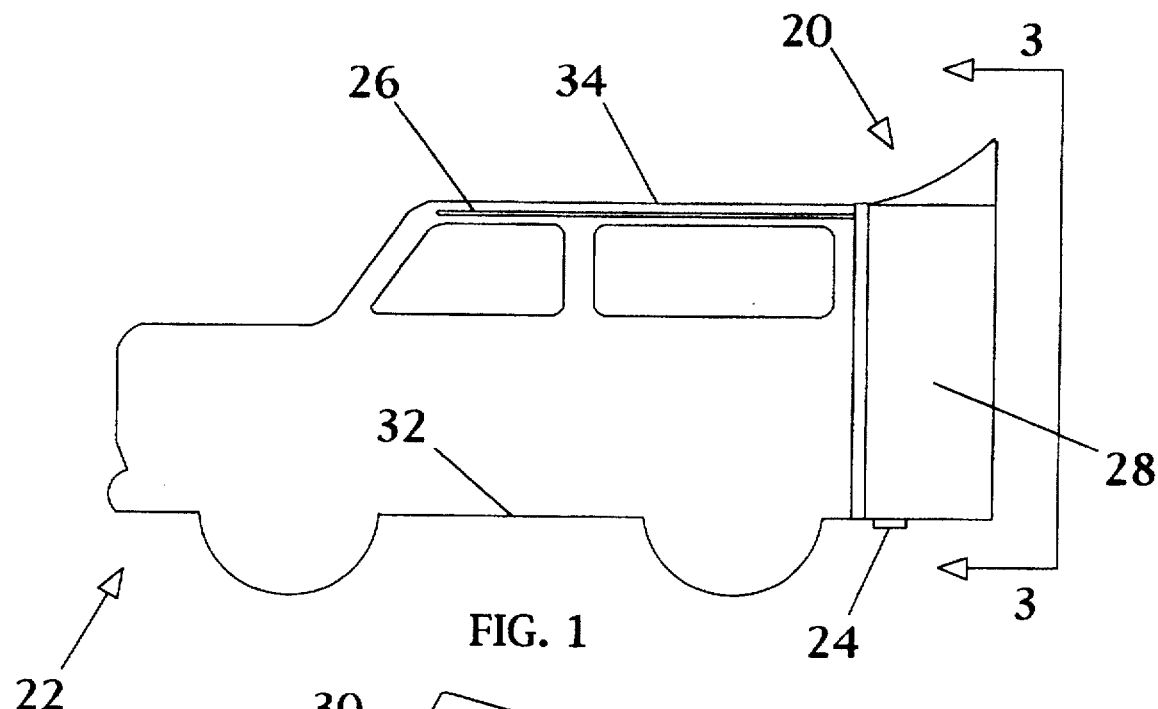
FIG. 1 is a perspective view of a vehicle having a Vehicle Wind Deflector mounted thereon.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a sport utility vehicle 22 having a Vehicle Wind Deflector 20 strapped 24 on the rear end portion thereof. In the embodiment of the invention shown in FIG. 1 the straps 24 are positioned between the top interior corners of the Vehicle Wind Deflector 20 and the rain gutter 26 which extends horizontally over the side windows of the vehicle 22, as well as on the bottom portion of the side members 28 of the wind deflector 20.

Figure 2:
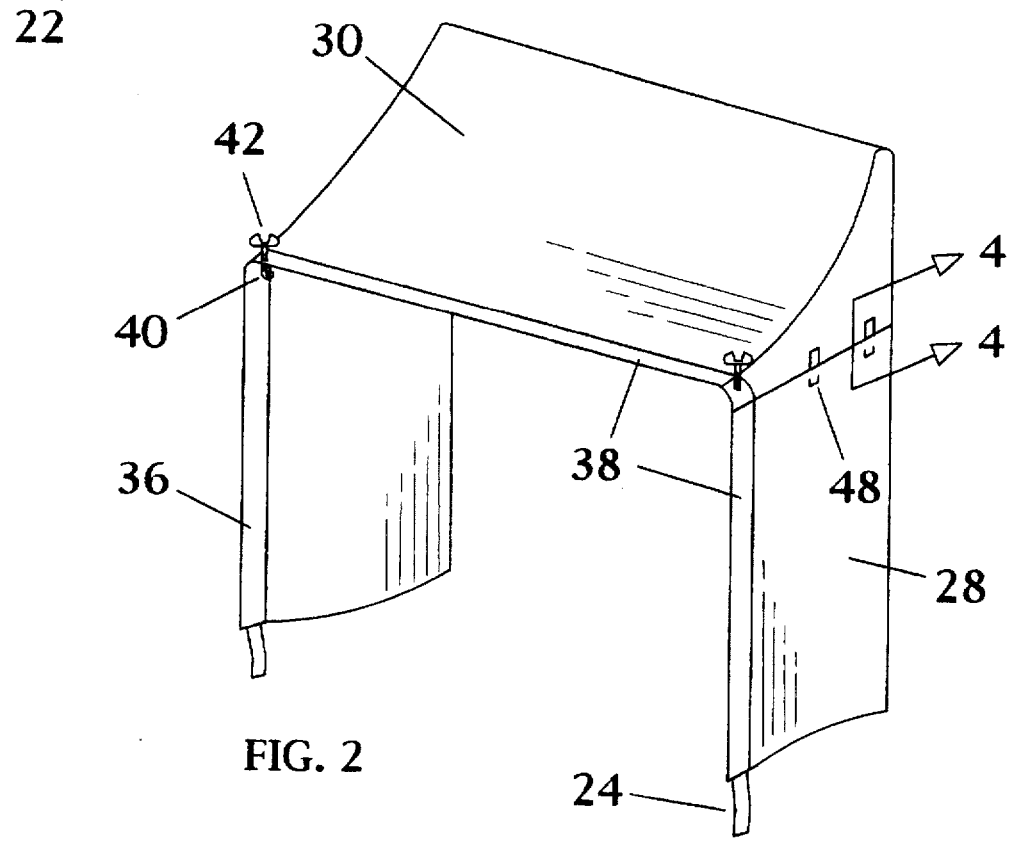
FIG. 2 is an enlarged perspective view of the Vehicle Wind Deflector shown in FIG. 1.

FIG. 2 is an enlarged perspective view of the Vehicle Wind Deflector 20 shown in FIG. 1. The Wind Deflector 20 comprises a top member 30 having a front side portion seated on and extending across the rear portion of the vehicle 22, said top member 30 curving upwardly from its front side portion to its rear side portion; two side members 28 each having a top side portion releasably fastened to opposite end side portions of the top member 30, a front side portion extending downwardly along the side portion of the vehicle 22, said side members 28 curving outwardly from their front side portion to a rear side portion thereof; and, releasable fastening means 40, 24 for fastening the top and side members to the vehicle 22. The front side portion of the top member 30 is generally the width of the vehicle 22. The front side portion of the side members 28 is generally the height of the vehicle 22 as measured from the bottom of the frame 32 to the top of the roof 34. The rear side portion of the top member 30 is generally 18" higher than the roof 34 of the vehicle 22. The top side portion of the top member 30 curves upwardly from the front side portion thereof to the rear side portion thereof. Measured along the length of the vehicle 22 the top member 30 and two side members 28 have a depth of generally 2 feet. Like the top member 30 the two side members 28 each also curve outwardly generally 18". That is the rear side portions of the side members 28 are together generally 36" wider than the front side portions of the side members 28 as measured laterally across the vehicle 22. It should be understood that the outward curvature and depth of the members 30, 28 may be varied to best deflect wind for a specific size of vehicle 22 pulling a particular size of trailer (not shown).

FIG. 2 also shows an alternative and preferred means for anchoring the top member 30 to the vehicle 22. A hook bolt 40 has a bottom portion which hooks beneath the rain gutter 26, a central portion which extends upwardly through the opposite ends of the front lip 38 on the top member 30, and a top end portion having a wing nut 42 thereon. As shown in FIG. 1 straps 24 are used for anchoring the bottom portion of the side members 28 to the vehicle 22. A protective rubber grip strip 36 extends around the interior of the front lip 38 on the members 28, 30.

Figure 3:
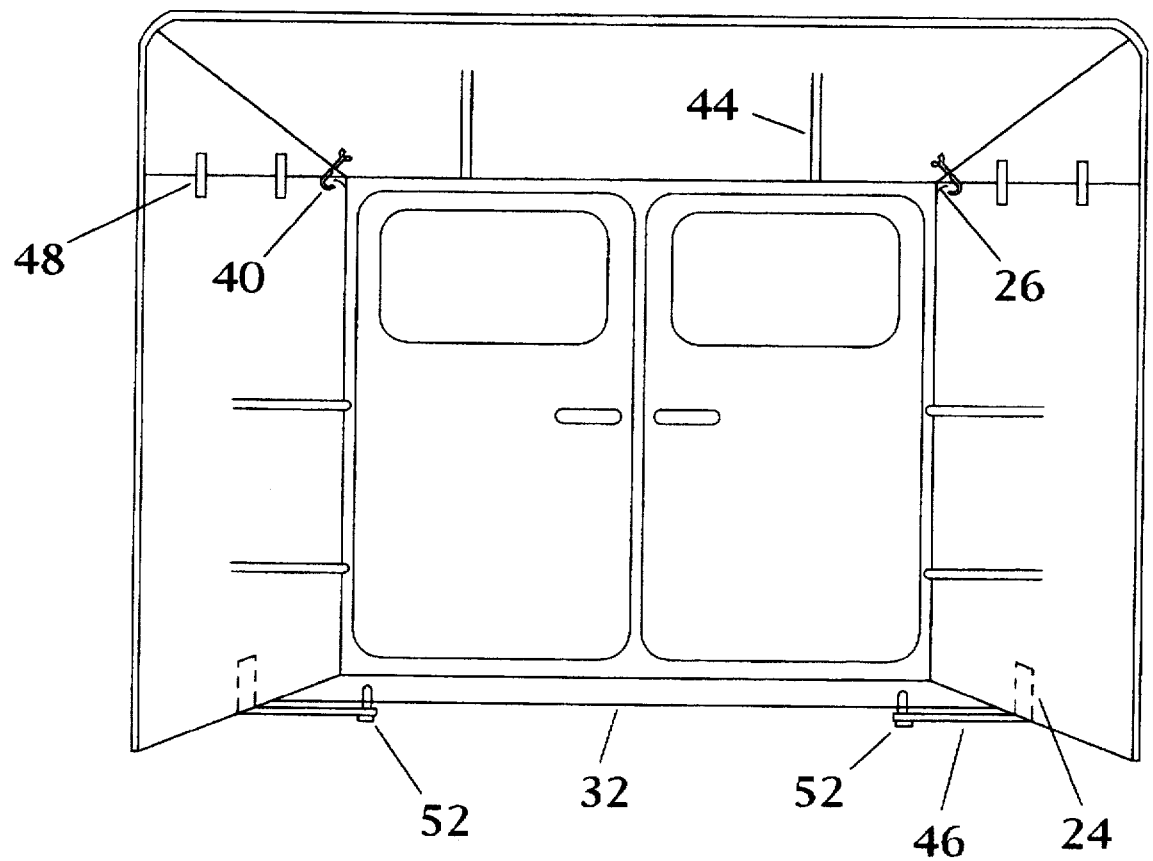
FIG. 3 is a rear view of the vehicle taken along line 3—3 in FIG. 1.

FIG. 3 is a rear view of the vehicle taken along line 3—3 in FIG. 1. Braces 44 extend perpendicularly outward, and rearwardly from the front lip 38 of the members 28, 30. In the preferred embodiment of the invention there are two braces 44 spaced on each member 28 or 30. Each brace 44 also extends rearwardly and inwardly from the back central and interior portion of each respective member 28 or 30. A steel bar 46 welded to the lower portion of the frame 32 of the vehicle 22 extends laterally outwards so that the bottom portion of the side members 28 may rest thereon and be strapped 24 thereto. In the preferred embodiment there are two bars 46 each having an interior side portion rotatably mounted on the frame 32 so that they may be rotated inwardly when not in use. Buckles 48 positioned between the top member 30 and side members 28 releasably fasten the two together.

Figure 4:
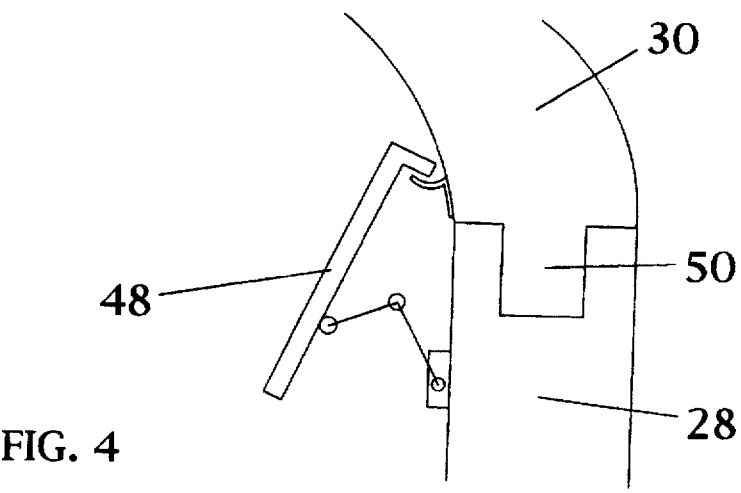
FIG. 4 is an enlarged cross sectional view taken along line 4—4 on FIG. 2.

FIG. 4 is an enlarged cross sectional view taken along line 4—4 on FIG. 2. One of the top member 30 and a side member 28 has a vertically extending projection 50 which is matably received by the other of the two. A buckle 48 releasably holds the top 30 and side members 28 together.

The members 28, 30 are molded from a durable semi rigid plastic. They are lightweight, and when disassembled they are compact and convenient to store or ship. Before they are used a bar 46, must be fastened to the frame 32 beneath the vehicle 22. In the preferred embodiment, two bars 46 are used, each has an interior end portion which is bolted 52 to the frame 32 so that said bars 46 may be rotated inwardly when not in use. After the bars 46 are mounted on the vehicle 22 the next step which must be taken to use the wind deflector 20 is to buckle 48 the top 30 and side members 28 thereof together. The wind deflector 20 is then seated over and around the rear portion of the vehicle 22. Straps 24 are tied to the bars 46 and the hook bolts 40 are tightened catching beneath the rain gutter 26 on the vehicle 22. After use the Vehicle Wind Deflector 20 may be removed from the vehicle 22 without marring or otherwise marking it. The wind deflector 20 is easily disassembled for storage.

While the invention has been described with preferred specific embodiments thereof, it will be understood that this description is intended to illustrate and not to limit the scope of the invention, which is defined by the following claims.

I claim:

1. A wind deflector for releasable attachment to a vehicle, comprising:
   (a) a top member comprising:
      (a) a curving top portion, extending between a front side portion and a rear side portion, the front side portion terminating in a front lip carrying a protective rubber grip strip seatable on and extending across a rear portion of the vehicle, wherein the rear side portion of the curving top portion is elevated above the front lip of the front side portion;
      (b) two opposed end side portions, each end side portion substantially perpendicular to, and adjacent to, the curving top portion, each end side portion having a first tongue and groove fastener portion; and
      (c) brace means, carried by the top member, for providing additional strength;
   (b) two side members, each side member having a curved body, each side member further comprising:
      (a) an upper edge, having a second tongue and groove fastener portion for releasably engaging the first tongue and groove fastener portion carried by a lower edge of the end side portions of the top member;
      (b) a front lip, carrying a protective rubber grip, adjacent to the vehicle;
      (c) a bottom portion, carrying an anchoring strap; and
      (d) brace means, carried by the side members for providing additional strength;
   (c) two bars, rotatably mounted on a frame of the vehicle, wherein the bars may be rotated between a first position for attachment to the anchoring straps of the side members and for support of the weight of the wind deflector, and a second position wherein the bars are rotated inwardly when not in use;
   (d) first and second hook bolts, the hook belts extending through opposite ends of the front lip of the top member, each hook bolt having a first end fastenable to a rain gutter carried by the vehicle and a second end securable by a wing nut, thereby securing the top member to the vehicle; and
   (e) at least one buckle, carried by each side member, for releasable attachment to the top member, thereby securing each side members to the top member.

2. The wind deflector for releasable attachment to a vehicle of claim 1, wherein the distance between the rear side portions of the side members is 36 inches greater than the distance between the front side portions of the side members.

3. The wind deflector for releasable attachment to a vehicle of claim 1, wherein the rear side portion of the top member is 18 inches higher than the front lip of the curving top portion of the top member.

* * * * *